(12) United States Patent
Oh et al.

(10) Patent No.: US 9,237,290 B2
(45) Date of Patent: Jan. 12, 2016

(54) DISPLAY APPARATUS OF RECEIVING MILLIMETER WAVE OR TERAHERTZ WAVE UNDER NON-LINE-OF-SIGHT CONDITIONS AND DISPLAYING METHOD THEREOF

(71) Applicant: KOREA ADVANCED INSTITUTE OF SCIENCE AND TECHNOLOGY, Daejeon (KR)

(72) Inventors: InnYeal Oh, Daejeon (KR); ChulSoon Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 83 days.

(21) Appl. No.: 14/081,183

(22) Filed: Nov. 15, 2013

(65) Prior Publication Data
US 2014/0354891 A1    Dec. 4, 2014

(30) Foreign Application Priority Data

May 31, 2013   (KR) .......................... 10-2013-0062464

(51) Int. Cl.
| | | |
|---|---|---|
| *H04B 1/38* | (2015.01) | |
| *H04N 5/44* | (2011.01) | |
| *H04N 21/4363* | (2011.01) | |
| *H04N 21/41* | (2011.01) | |

(52) U.S. Cl.
CPC ............. *H04N 5/44* (2013.01); *H04N 21/4122* (2013.01); *H04N 21/43637* (2013.01)

(58) Field of Classification Search
CPC ....... H04N 5/44; H04N 21/43637; H04B 1/16
USPC ............. 455/73, 83, 566, 130, 131, 132, 134, 455/145, 207, 272, 277.1, 303; 345/156, 345/204, 101
See application file for complete search history.

(56) References Cited

U.S. PATENT DOCUMENTS 7,310,503 B2 * 12/2007 Ido ................................. 455/140
2012/0092284 A1 * 4/2012 Rofougaran et al. ......... 345/173

FOREIGN PATENT DOCUMENTS

KR    10-2012-0030200 A    3/2012

* cited by examiner

*Primary Examiner* — Tuan Pham
(74) *Attorney, Agent, or Firm* — Rabin & Berdo, P.C.

(57) ABSTRACT

Provided is a display apparatus for receiving millimeter waves or terahertz waves from a transmitter under a non-line-of-sight condition, the apparatus including: a plurality of diversity boards that are installed in a bezel of the display apparatus, receive millimeter waves or terahertz waves having different paths, convert the received waves into a plurality of baseband signals, and sense output powers of the plurality of baseband signals; a controller to output a control signal for selecting a diversity board of a maximum output power from the output powers sensed by the plurality of diversity boards; a selector to connect the diversity board of the maximum output power among the plurality of diversity boards to an image converter by the control signal; and the image converter to convert an output of the selector into image data for displaying.

11 Claims, 7 Drawing Sheets

DISPLAY APPARATUS OF RECEIVING MILLIMETER WAVE OR TERAHERTZ WAVE UNDER NON-LINE-OF-SIGHT CONDITIONS AND DISPLAYING METHOD THEREOF

BACKGROUND OF THE INVENTION

1. Field of the Invention

The present invention relates to a large display apparatus that receives millimeter waves or terahertz waves from a mobile communication terminal under non-line-of-sight (NLOS) conditions, and more particularly, to a plurality of diversity boards of the large display apparatus that displays massive data seamlessly using millimeter or terahertz communication.

2. Description of the Prior Art

A technology that directly connects a smart phone to a display for demonstration or presentation has been developed. A technology for massive and high-speed communication could be based on a millimeter wave or terahertz wave wireless communication.

Millimeter waves or terahertz waves travel in straight lines and thus, may be used for line-of-sight (LOS) communication. For a non-line-of-sight (NLOS) communication condition, beam-forming technology is generally utilized. Since the beam-forming technology consumes a large amount of power by using a plurality of transceivers, and increases the size of a product, it is difficult to be embodied in a mobile communication terminal such as a smart phone. There is required for a technology that enables communication in an NLOS communication environment in which hindrance occurs when millimeter waves or terahertz waves are used to transmit massive data at high-speed through a mobile communication terminal such as a smart phone.

A transceiver to which a beam-forming technology is applied according to the conventional art configures a transmitter and a receiver in an array structure and provides various RF paths. A phase of each wave is controlled and the wave arrives at the receiver by avoiding an obstacle.

Figure 1:
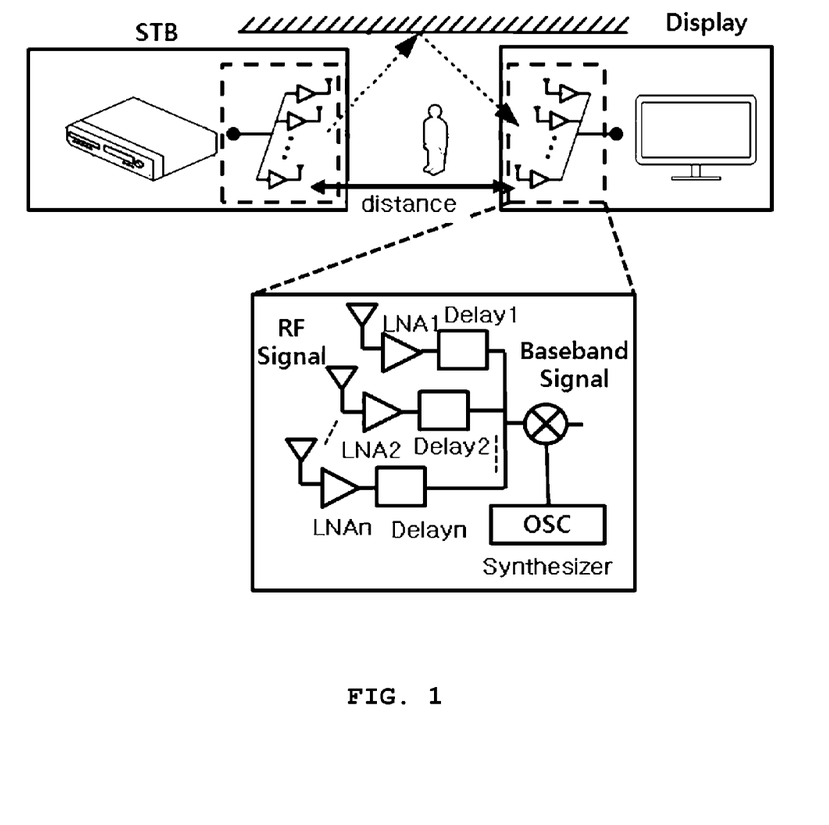
FIG. 1 illustrates a transceiver based on a beam-forming scheme according to a conventional art.

The beam-forming technology illustrated in FIG. 1 provides various paths using an array of antennas and transceivers. Therefore the beam-forming technology may increase a size of a product.

The receiver based on the beam-forming scheme of FIG. 1 has various paths for millimeter waves, and includes a delay device having a different delay time for each path so as to change a phase of each signal. The receiver embodied as an array performs reception by changing an antenna beam pattern in various directions, so as to perform millimeter wave communication by avoiding a bather during transmission and reception.

To embody the beam-forming technology, multiple signal paths are basically required and thus, a large amount of power is consumed and a size of a transceiver is also large. When N paths exist, an amount of power consumption N times greater than an amount of power consumption of a general transmitter or receiver (a transmitter or receiver including a single path) may occur, and a size of a product increases in proportion to a number of arrays.

Korean published patent No. 2012-0030200 discloses a method and apparatus for transmitting data using multiple antennas and beam-forming, which supports a predetermined beam-width regardless of an emission angle and prevents power loss caused by spreading of an angle, but has difficulty in decreasing a size by including an antenna array in a transmitting terminal.

SUMMARY OF THE INVENTION

Accordingly, the present invention has been made to solve the above-mentioned problems occurring in the prior art, and an aspect of the present invention is to provide a display apparatus that receives millimeter waves or terahertz waves under a non-line-of-sight (NLOS) condition, which overcomes a drawback of beam-forming during millimeter wave communication between a mobile communication terminal and a large display, thereby embodying seamless data communication which supports a high-definition moving picture in communication under the NLOS condition through a mobile communication terminal such as a smart phone, a small circuit area, a low power consumption, and a small size of a product.

In accordance with an aspect of the present invention, there is provided a display apparatus for receiving millimeter waves or terahertz waves from a transmitter under a non-line-of-sight (NLOS) condition, the apparatus comprising a plurality of diversity boards that are installed in a bezel of the display apparatus, receive millimeter waves or terahertz waves having different paths, convert the received waves into a plurality of baseband signals, and sense output powers of the plurality of baseband signals; a controller to output a control signal for selecting a diversity board of a maximum output power from the output powers sensed by the plurality of diversity boards; a selector to connect the diversity board of the maximum output power among the plurality of diversity boards to an image converter by the control signal; and the image converter to convert an output of the selector into image data for displaying.

Preferably, the plurality of diversity boards each include a baseband signal converter to convert millimeter waves or terahertz waves into baseband signals, and a power detector to sense output powers of the baseband signal converter and a signal of an NLOS condition.

Preferably, the diversity board comprises: the baseband signal converter that installs an antenna in the bezel of the display apparatus, and converts millimeter waves or terahertz waves that the antenna receive into a baseband signal; a coupler to couple output powers of the baseband signal converter to the power detector and the selector; and the power detector to sense power of the output of the coupler and an NLOS condition.

Preferably, the display apparatus is in a state of being turned-on, the plurality of diversity boards are in a state of being turned-on.

In accordance with another aspect of the present invention, there is provided a display apparatus for receiving millimeter waves or terahertz waves from a transmitter under an NLOS condition, the display apparatus comprising a plurality of baseband signal converters that install antennas in a bezel of the display apparatus, at predetermined intervals, receive millimeter waves or terahertz waves having different paths, and convert the received waves into baseband signals; and a mainboard to compare outputs of the plurality of baseband signal converters, and to convert an output of a baseband signal converter that provides a maximum baseband output into image data for displaying.

Preferably, the plurality of baseband signal converters are installed in the bezel of the display apparatus at the predetermined intervals of a range of $10\lambda \sim 20\lambda$ of a millimeter wave or a terahertz wave.

Preferably, the mainboard comprises a controller to output a control signal for comparing outputs of the plurality of baseband signal converters and selecting a baseband signal converter that provides a maximum output; a selector to select an output of a baseband signal converter from among outputs of the plurality of baseband signal converters in response to the control signal, and to transmit the selected output to a signal processor; and the signal processor to transmit, to the controller, a result of sensing output powers of a connected baseband signal converter from the output of the selector, and to convert the output of the selector into image data for displaying on the display apparatus.

Preferably, the signal processor comprises a coupler to couple the output of the selector to a power detector and a de-serializer; the power detector to sense power of a first output of the coupler; and the de-serializer to convert a second output of the coupler into a parallel signal.

Preferably, the signal processor further comprises an LCD interface to convert an output from the de-serializer into a display format, and to output the display format to the display apparatus.

Preferably, the baseband signal converter comprises: an antenna to receive millimeter waves or terahertz waves from the transmitter; a low-noise amplifier to amplify signals that the antenna receive; and a mixer to convert signals of the low-noise amplifier to baseband signals.

Preferably, the plurality of baseband signals converters are in a state of being turned-on when the display apparatus is in a state of being turned-on.

In accordance with further another aspect of the present invention, there is provided an operating method of a display apparatus that receives millimeter waves or terahertz waves under a non-line-of-sight (NLOS) condition, the operating method comprising the steps of receiving, by a plurality of baseband signal converters installed in a bezel of the display apparatus, a millimeter wave or a terahertz wave and converting the received waves into baseband signals, and sensing, by a plurality of power detectors, output power levels of the plurality of baseband signal converters and transmitting the sensed levels to a controller; setting, by the controller, a baseband signal converter that outputs a maximum signal level based on the received signals and transmitting a control signal to a selector, and selecting, by the selector, an output of the baseband signal converter of the maximum output from among the plurality of baseband signal converters in response to the control signal, and converting the selected output into image data for displaying; transmitting signals sensed by the plurality of power detectors to the controller when an NLOS condition occurs while the baseband signal converter of the maximum output performs a receiving operation; and resetting, by the controller, a baseband signal converter that outputs a maximum signal level, transmitting a control signal to the selector, and converting an output of the baseband signal converter into image data for displaying on the display apparatus.

In accordance with further another aspect of the present invention, there is provided a transceiving system including a mobile communication terminal and a display apparatus equipped with a receiver that receives millimeter waves or terahertz waves from the mobile communication terminal under a NLOS condition, wherein the transceiving system comprises a mobile communication terminal configured of a single transmitter and an omni-directional antenna that transmits millimeter waves or terahertz waves that are modulated by the transmitter; and a display apparatus that includes a plurality of diversity boards installed in a bezel of the display apparatus at predetermined intervals, and includes a power detector for each of the plurality of diversity boards so as to sense a signal of an NLOS condition or a maximum output signal from output powers when the received millimeter waves or terahertz waves are converted into baseband signals, and to convert an output of a diversity board that obtains maximum output power into image data for displaying.

Preferably, the display apparatus comprises the plurality of diversity boards to receive millimeter waves or terahertz waves having different paths, to convert the received waves into a plurality of baseband signals, and to sense output powers of the plurality of baseband signal converters; a controller to output a control signal for selecting a diversity board of a maximum output power from the output powers sensed by the plurality of diversity boards; a selector to select the diversity board of the maximum output power among the plurality of diversity boards based on the control signal, and to connect the diversity board to an image converter; and the image converter to convert an output of the selector into image data for displaying.

Effect of the Invention

A high-capacity wireless communication scheme according to the present invention applied to a display apparatus overcomes a drawback of beam-forming, consumes a small amount of power, decreases a size of a product by decreasing an amount of diversity operations.

According to an embodiment of the present invention, diversity is embodied in a baseband signal band so that signals are readily transferred in a large display, and all of the baseband signal converters and power detectors are always turned on and thus, quick signal switching and seamless massive image data communication are enabled.

According to an embodiment of the present invention, seamless data reception is enabled although an NLOS condition frequently occurs.

According to an embodiment of the present invention, massive data is transmitted from a mobile communication terminal to a large display apparatus without data loss even in an NLOS environment.

According to an embodiment of the present invention, a mobile communication terminal is embodied as a single transmitter as compared with an array structure of beam forming technology, and complexity of a circuit is decreased and a circuit area is dramatically decreased and thus, an amount of power consumed by a mobile communication terminal decreases and a size of the mobile communication terminal is decreased.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 2:
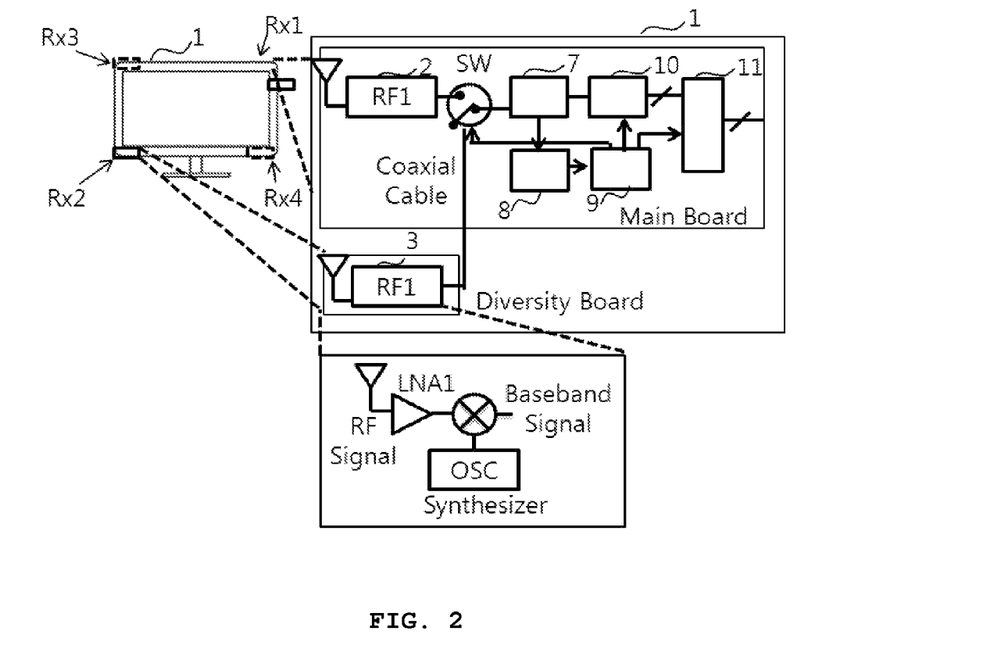
FIG. 2 is a diagram of a display apparatus that receives millimeter waves or terahertz waves under a non-line-of-sight (NLOS) condition according to an embodiment of the present invention.

Referring to FIG. 2, a display apparatus 1 that receives millimeter waves or terahertz waves under a non-line-of-sight (NLOS) condition according to an embodiment of the present invention includes a first baseband signal converter 2 through a fourth baseband signal converter 5, and a main board 12 formed of a selector 6, a controller 9, and a signal processor 27. The signal processor 27 includes a coupler 7, a power detector 8, a de-serializer 10, and an LCD interface 11.

The first baseband signal converter 2 through the fourth baseband signal converter 5 are configured to receive millimeter waves or terahertz waves through different paths and converts the wave into baseband signals. The plurality of baseband signal converters 2, 3, 4, and 5 are disposed at four corners in a bezel of the display apparatus 1. The baseband signal converters are installed at predetermined intervals, the interval being integer multiples of a wavelength. It is desirable that the plurality of baseband signal converters 2, 3, 4, and 5 are installed at intervals of 10λ~20λ, which is a range of a wavelength of the received millimeter wave or terahertz wave. Signals received through antennas of the plurality of baseband signal converters 2, 3, 4, and 5 respectively, experience different phase changes and thus, may have low correlativity with one another. Therefore, two signals are independent from multi-path fading and thus, when one signal falls in deep fading, the other signal has a low probability of falling in fading. Accordingly, signal absence during transmission may be prevented.

Figure 3:
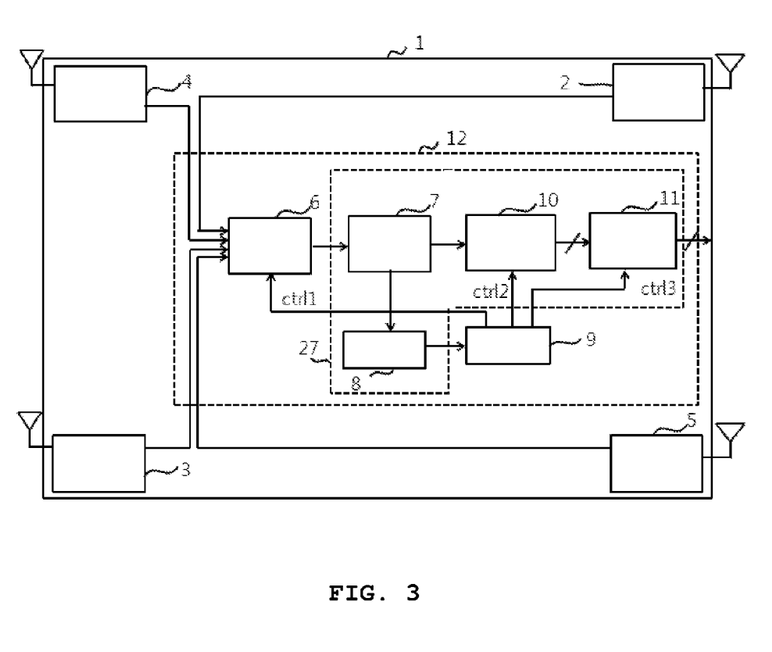
FIG. 3 is a detailed diagram of a display apparatus that receives millimeter waves or terahertz waves under an NLOS condition according to an embodiment of the present invention.

A display apparatus of FIG. 3 according to an embodiment of the present invention is associated with an invention that applies a diversity technology to a display apparatus that switches a baseband signal in the selector 6 so as to improve communication quality, as compared with applying a diversity technology that switches a signal from an antenna that receives millimeter waves or terahertz waves used in mobile communication. Particularly, high-capacity data such as image contents is received from a mobile communication terminal and the plurality of baseband signal converters 2, 3, 4, and 5 are always turned on and thus, a baseband signal converter that provides a maximum output is selected immediately when an NLOS condition occurs. That is, the plurality of baseband signal converters are in a state of being turned-on when the display apparatus is in a state of being turned-on, but an amount of power consumption is negligible. Accordingly, although an NLOS condition occurs in a currently connected baseband signal converter, another baseband signal converter receives data and thus, data reception is normally performed by immediately connecting the other baseband signal converter.

To maximize a diversity function, it is desirable that the baseband signal converters 2, 3, 4, and 5 are disposed at 4 corners of the large display apparatus 1. When a millimeter wave diversity technology is applied to the large display, a mobile communication terminal may perform NLOS communication through use of a single transmitter as compared with using beam forming technology. Therefore, the NLOS communication may be embodied through low power consumption and a small size thus, the NLOS communication may be readily embodied through the mobile communication terminal. In addition, a wave that is closer to a millimeter wave has a shorter wavelength and thus, fading may occur less frequently when diversity is embodied in the display apparatus 1.

Figure 4:
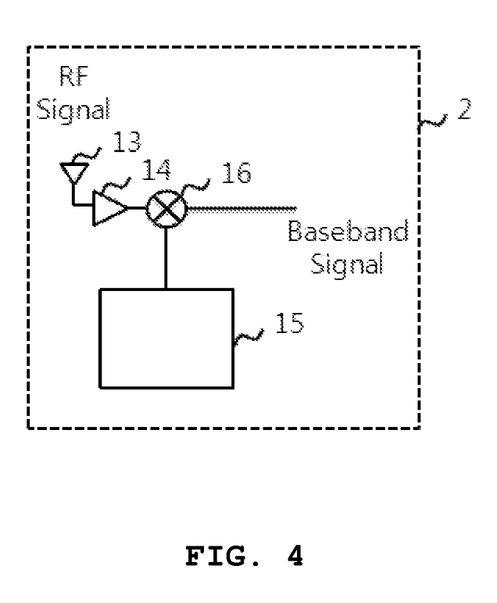
FIG. 4 is a detailed diagram of a first baseband signal converter of FIG. 3.

Referring to FIG. 4, each baseband signal converter includes an antenna 13, a low noise amplifier 14, an oscillator 15, and a mixer 16.

The antenna 13 receives millimeter waves or terahertz waves from the mobile communication terminal, and the low noise amplifier 14 amplifies the signal that the antenna 13 receives. The mixer 16 converts output signals of the low noise amplifier 14 into baseband signals. It is desirable that the baseband signal converter is applied to communication that is capable of securing a sufficient interval between baseband signal converters since a wavelength is short, such as millimeter wave communication, so that millimeter waves are received even when an NLOS condition occurs and is output to a display apparatus. The baseband signal converter according to the present invention may be manufactured by integrating an antenna and a receiver into a single chip within a size of approximately 4×10 mm.

The mainboard 12 compares outputs of the plurality of baseband signal converters 2, 3, 4, and 5, and converts an output of a baseband signal converter that provides a maximum baseband output into image data for displaying on the display apparatus 1.

The mainboard 12 includes the controller 9, the selector 6, and the signal processor 27.

The controller 9 outputs a first control signal (ctrl1) for sensing the outputs of the plurality of baseband signal converters 2, 3, 4, and 5 and selecting the first baseband signal converter 2 that provides a maximum output, outputs a second control signal (ctrl2) to the de-serializer 10 for controlling a number of parallel processing, and outputs a third control signal (ctrl3) to the LCD interface 11 for setting a display condition of the image data.

The selector 6 selects the output of the first baseband signal converter 2 from among the plurality of baseband signal converters 2, 3, 4, and 5, in response to the first control signal (ctrl1), and transmits the selected output to the signal processor 27. The selector 6 is embodied as a switching device or a switch.

The signal processor 27 transmits, to the controller 9, a result of sensing output powers of a connected baseband signal converter from the output of the selector 6, converts the output of the selector 6 into image data, and transmits the image data to the display apparatus 1. The signal processor 27 includes the coupler 7, the power detector 8, the de-serializer 10, and the LCD interface 11.

The coupler 7 couples a first output of the selector 6 to the power detector 8, and couples a second output of the selector 6 to the de-serializer 10. The coupler 7 provides two paths for the outputs of the selector 6. The coupler 7 is a component that derives a directivity of an output signal to avoid effect among high-frequency output signals, and is embodied as a directional coupler, a combiner, a circulator, or the like.

The power detector 8 senses power of the first output of the coupler 7. That is, outputs of the plurality of baseband signal converters 2, 3, 4, and 5 are provided to the coupler 7 through the selector 6 and thus, output power of the plurality of signal converters 2, 3, 4, and 5 are sensed and are transmitted to the controller 9.

The de-serializer 10 converts the second output of the coupler 7 into parallel signals. Also, the second output is converted into R, G, and B image signals, an YCbCr image signal, or a voice signal through an analog-digital converter.

The LCD interface 11 converts an image signal or a voice signal which is an output from the de-serializer 10 into a display format and outputs the display format to the display apparatus 1.

The display apparatus 1 drives R, G, and B image signals which are outputs of the LCD interface 11, for displaying. The display apparatus 1 may include a Plasma Display Panel (PDP), a Liquid Crystal Display (LCD), an Organic Light Emitting Diode (OLED), or a flexible display.

Figure 5:
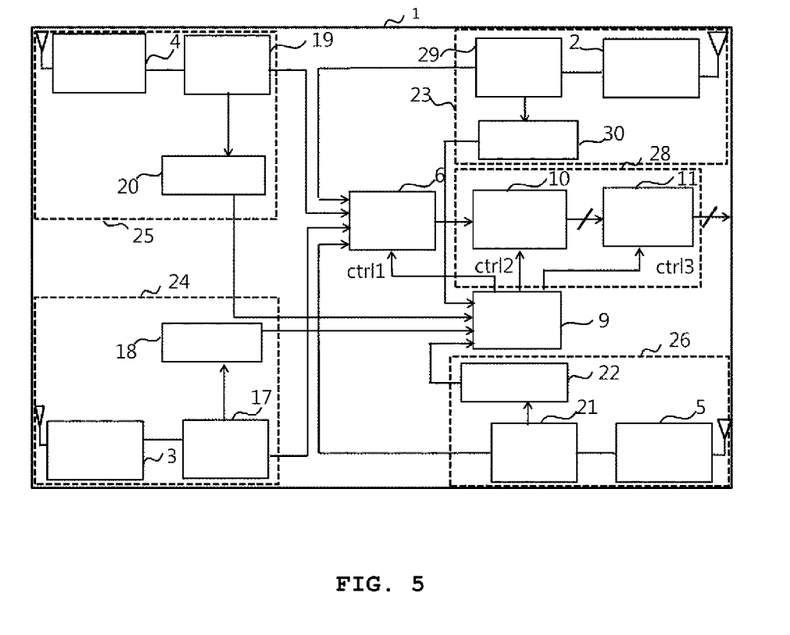
FIG. 5 is a detailed diagram of a display apparatus that receives millimeter waves or terahertz waves under an NLOS condition according to another embodiment of the present invention.

FIG. 5 illustrates the display apparatus 1 that receives millimeter waves or terahertz waves under NLOS conditions according to another embodiment of the present invention, which includes a first diversity board 23 through a fourth diversity board 26, the controller 9, the selector 6, and an image converter 28.

The plurality of diversity boards 23, 24, 25, and 26 include baseband signal converters 2, 3, 4, and 5, couplers 29, 17, 19, 21, and power detector 30, 18, 20, and 22, respectively. The controller 9 selects a baseband signal converter having a maximum output characteristic, based on a signal sensed by the power detectors 30, 18, 20, and 22. The selector 6 selects a baseband signal which is an output of each coupler 29, 17, 19, or 21, and transmits the selected output to the de-serializer 10. The diversity boards that are installed in a bezel of the display apparatus 1, receive millimeter waves or terahertz waves which have no fading between received signals and has different paths, convert the received waves into a plurality of baseband signals, and detect an NLOS condition from the plurality of baseband signals.

The plurality of diversity boards 23, 24, 25, and 26 are in a state of being turned-on when the display apparatus 1 is in a state of being turned-on, but an amount of power consumed is negligible. Accordingly, although an NLOS condition occurs in a currently connected baseband signal converter, another baseband signal converter receives data and thus, data reception is normally performed by immediately connecting the other baseband signal converter.

The controller 9 outputs a control signal (ctrl1) for selecting a baseband signal of a maximum output characteristic from the signals that the plurality of diversity boards 23, 24, 25, and 26 detect.

The selector 6 selects one of the baseband signals converted by the plurality of diversity boards 23, 24, 25, and 26 based on the control signal (ctrl1), and outputs the selected signal to the image converter 28.

The image converter 28 converts the output of the selector 6 into image data.

The display apparatus of FIG. 5 is different from the display apparatus of FIG. 3. The display apparatus of FIG. 3 senses, using the power detector 8, output powers of a baseband signal converter after a switching operation by the selector 6. However, the display apparatus of FIG. 5 senses an output of a baseband signal converter before being connected to the selector 6, or output power of a coupler. Accordingly, when an NLOS condition occurs in data transmission to a currently selected baseband signal converter, referring to FIG. 6, data transmission to the display may be interrupted for a moment when the selector select the same baseband converter again after disappearing the NLOS condition because the baseband signal converters are sequentially connected.

Conversely, the display apparatus of FIG. 5 is capable of sensing the NLOS condition using the power detector 30, 18, 20, and 22 respectively. Since the diversity boards are not connected sequentially by the selector 6, the controller 9 may make a decision in a state that one of baseband converter provides a maximum output thus, seamless data reception is performed although an NLOS condition occurs.

Figure 6:
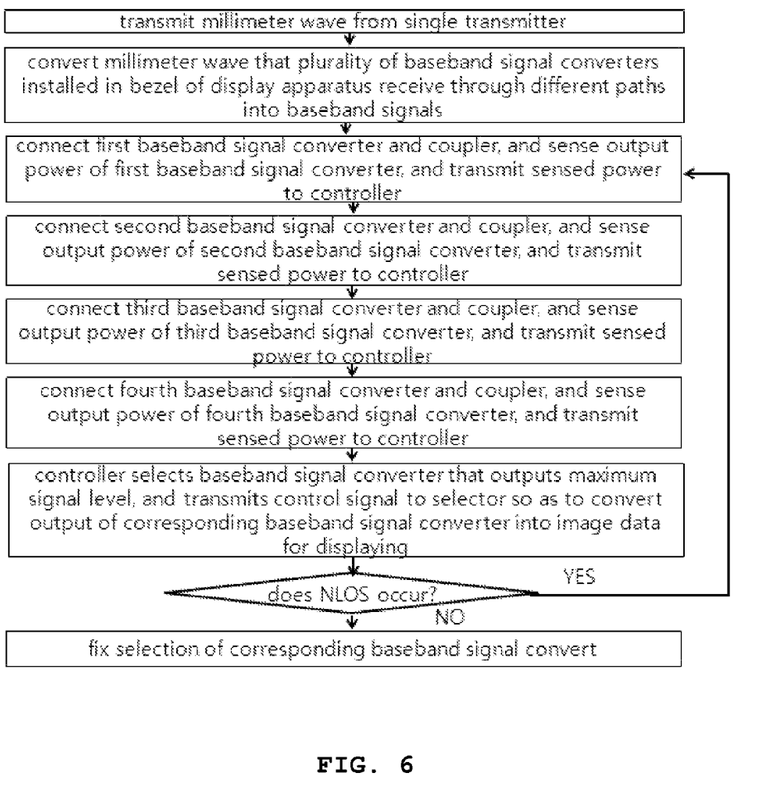
FIG. 6 is a flowchart illustrating an operating method of the display apparatus of FIG. 3 that displays a millimeter wave or a terahertz wave received from a mobile communication terminal under an NLOS condition according to an embodiment of the present invention.

FIG. 6 is a flowchart illustrating an operating method of the display apparatus of FIG. 3 that receives millimeter waves from a mobile communication terminal under NLOS conditions for displaying on the display apparatus according to an embodiment of the present invention.

The mobile communication terminal transmits data using a millimeter wave or terahertz wave transmitter. The present invention uses a diversity technology using a plurality of receivers and a power detector included in a bezel of a display. Accordingly, by applying the present invention, a mobile communication terminal that consumes a small amount of power and decreases a size may be embodied using a single antenna such as an omnidirectional antenna, and a single transmitter for the mobile communication terminal.

The plurality of baseband signal converters 2, 3, 4, and 5 are disposed in a bezel of the display apparatus at intervals of $10\lambda \sim 20\lambda$, receive, from a mobile communication terminal, millimeter waves or terahertz waves through an antenna, amplify the received waves using the low-noise amplifier 14, and output baseband signals.

To detect a path through which a signal of a maximum level comes from among the plurality of baseband signal converters 2, 3, 4, and 5, the controller 9 alternately connects switches connected to the baseband signal converters 2, 3, 4, and 5 to the coupler 7, compares paths to detect a path that carries a maximum signal level, and selects the path through which the maximum signal is received.

Detailed descriptions thereof will be provided as follows. The power detector 8 senses a power level of a first output from the coupler 7, and the controller 9 selects a path through which a maximum power level is received, and outputs a first control signal (ctrl1) to the selector 6. For example, when a power level received when the first baseband signal converter 2 and the coupler 7 are connected corresponds to a maximum power level, the first control signal (ctrl1) for connecting the first baseband signal converter 2 to the coupler 7 is output, and connection between the second baseband signal converter and the coupler 7 is released. The coupler 7 converts data received in serial into parallel data and transmits the data to the display apparatus 1 through the LCD interface 11.

The path through which the maximum level is received is detected, the switch connection is fixed, and millimeter wave communication from the mobile communication terminal is performed.

When an NLOS condition occurs in the first baseband signal converter 2, a switch connection state is changed by selecting another path, data from the connected first baseband signal converter 2 is converted into image data and the data is displayed in the display apparatus.

Figure 7:
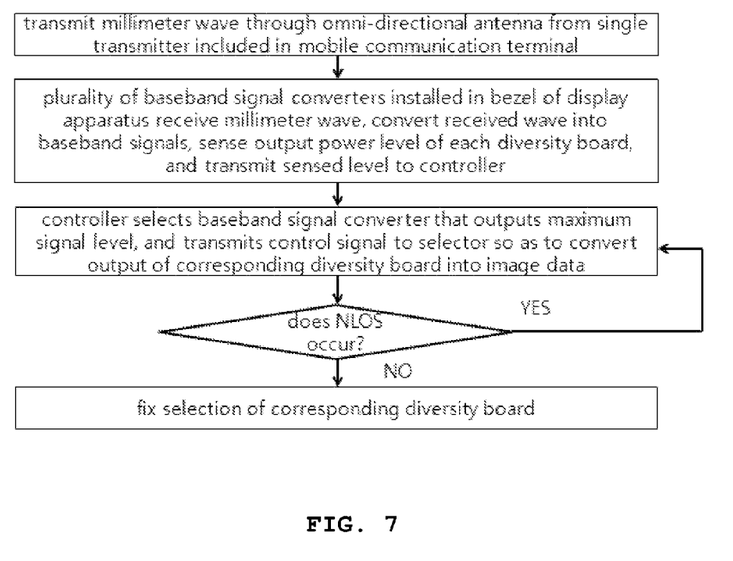
FIG. 7 is a flowchart illustrating an operating method of the display apparatus of FIG. 5 that displays a millimeter wave or a terahertz wave received from a mobile communication terminal under an NLOS condition according to an embodiment of the present invention.

FIG. 7 is a flowchart illustrating an operating method of the display apparatus 1 of FIG. 5 that receives millimeter waves or terahertz waves from a mobile communication terminal under NLOS conditions for displaying on the display apparatus according to an embodiment of the present invention.

Data is transmitted through a millimeter wave or terahertz wave transmitter included in the mobile communication terminal.

The plurality of baseband signal converters 2, 3, 4, and 5 installed in the bezel of the display apparatus receive millimeter waves or terahertz waves, convert the received waves into baseband signals, sense output power levels of respective diversity boards 23, 24, 25, and 26, and perform transmission to the controller 9.

The controller 9 selects a baseband signal converter that outputs a maximum signal level, transmits a control signal (ctrl1) to the selector 6, and converts an output of the corresponding baseband signal converter into image data for displaying.

When an NLOS condition occurs, the controller 9 that receives, in advance, a signal sensed by each power detector resets a baseband signal converter that provides a maximum output, transmits a control signal (ctrl1) to the selector 6, fixes the selection of the corresponding baseband signal converter when an NLOS does not occur, and converts an output of the corresponding baseband signal converter into image data for displaying on the display apparatus.

Comparing the method of FIG. 7 with the method of FIG. 6, the displaying method based on the second embodiment of FIG. 7 dramatically improves data transmission characteristics and enables seamless data reception when an NLOS condition occurs.

Therefore, the present invention overcomes a drawback of beam-forming technology, consumes a small amount of power, and decreases a size of a product. Since an amount of computations of diversity reduces, a transmitter mounted on a mobile communication terminal and a receiver mounted on a display may be simplified. The present invention enables users to seamlessly enjoy contents such as moving pictures from a mobile terminal to a large display apparatus. In addition, the present invention uses a single transmitter as compared with an array of transmitter of beam forming technology and thus, may communicate seamlessly under NLOS conditions with low power consumption, a small size, a small amount of diversity operations. Accordingly, a size of the transmitter is decreased and thus, it may be readily applied to a mobile communication terminal.

What is claimed is:

1. A display apparatus for receiving millimeter waves or terahertz waves from a transmitter under a non-line-of-sight (NLOS) condition, the apparatus comprising:
a plurality of diversity boards that are installed in a bezel of the display apparatus, receive millimeter waves or terahertz waves having different paths, convert the received waves into a plurality of baseband signals, and sense output powers of the plurality of baseband signals;
a controller to output a control signal for selecting a diversity board of a maximum output power from the output powers sensed by the plurality of diversity boards;
a selector to connect the diversity board of the maximum output power among the plurality of diversity boards to an image converter by the control signal; and
the image converter to convert an output of the selector into image data for displaying.

2. The display apparatus as claimed in claim 1, wherein each of the plurality of diversity boards includes a baseband signal converter to convert millimeter waves or terahertz waves into baseband signals, and a power detector to sense output powers of the baseband signal converter and a signal of an NLOS condition.

3. The display apparatus claimed in claim 2, wherein the diversity board comprises:
the baseband signal converter that installs an antenna in the bezel of the display apparatus, and converts millimeter waves or terahertz waves that the antenna receives into baseband signals;
a coupler to couple output powers of the baseband signal converter to the power detector and the selector; and
the power detector to sense output powers of the coupler and an NLOS condition.

4. The display apparatus as claimed in claim 1, wherein, when the display apparatus is in a state of being turned-on, the plurality of diversity boards are in a state of being turned-on.

5. A display apparatus for receiving millimeter waves or terahertz waves from a transmitter under a non-line-of-sight condition, the display apparatus comprising:
a plurality of baseband signal converters that are installed in a bezel of the display apparatus at predetermined intervals, receive millimeter waves or terahertz waves having different paths from antennas, and convert the received waves into baseband signals; and
a mainboard to compare output powers of the baseband signal converters, and to convert output powers of a baseband signal converter that provides a maximum baseband output into image data for displaying, the mainboard including
a controller to output a control signal for comparing output powers of the plurality of baseband signal converters and selecting a baseband signal converter that provides a maximum output power,
a selector to select an output power of a baseband signal converter among output powers of the baseband signal converters in response to the control signal, and to transmit the selected output to a signal processor, and
the signal processor to transmit a result of sensing output powers of a connected baseband signal converter from the output of the selector to the controller, and to convert the output of the selector into image data for displaying on the display apparatus, the signal processor including
a coupler to couple the output of the selector to a power detector and a de-serializer,
the power detector to sense power of a first output of the coupler, and
the de-serializer to convert a second output of the coupler into a parallel signal.

6. The display apparatus as claimed in claim 5, wherein the plurality of baseband signal converters are installed in the bezel of the display apparatus at the predetermined intervals of a range of $10\lambda \sim 20\lambda$ of a millimeter wave or a terahertz wave.

7. The display apparatus as claimed in claim 5, wherein the signal processor further comprises:
an LCD interface to convert an output from the de-serializer into a display format, and to output the display format to the display apparatus.

8. The display apparatus as claimed in claim 5, wherein the baseband signal converter comprises:
an antenna to receive millimeter waves or terahertz waves from the transmitter;
a low-noise amplifier to amplify signals that the antenna receives; and
a mixer to converting signals of the low-noise amplifier into baseband signals.

9. The display apparatus as claimed in claim 5, wherein the plurality of baseband signal converters are in a state of being turned-on when the display apparatus is in a state of being turned-on.

10. An operating method of a display apparatus that receives millimeter waves or terahertz waves under NLOS conditions, the operating method comprising the steps of:
receiving, by a plurality of baseband signal converters installed in a bezel of the display apparatus, millimeter waves or terahertz waves, and converting the received waves into baseband signals, and sensing, by a plurality of power detectors, output power levels of the plurality of baseband signal converters and transmitting the sensed levels to a controller;

setting, by the controller, a baseband signal converter that outputs a maximum signal level based on the received signals and transmitting a control signal to a selector, and selecting, by the selector, an output of the baseband signal converter of the maximum output from among the plurality of baseband signal converters in response to the control signal, and converting the selected output into image data for displaying;

transmitting signals sensed by the plurality of power detectors to the controller when an NLOS condition occurs while the baseband signal converter of the maximum output performs a receiving operation; and resetting, by the controller, a baseband signal converter that outputs a maximum signal level, transmitting a control signal to the selector, and converting an output of the baseband signal converter into image data for displaying on the display apparatus.

11. A transceiving system including a mobile communication terminal and a display apparatus equipped with a receiver that receives millimeter waves or terahertz waves from the mobile communication terminal under a non-line-of-sight (NLOS) condition, wherein the transceiving system comprises:

a mobile communication terminal configured of a single transmitter and an omnidirectional antenna that transmits millimeter waves or terahertz waves that are modulated by the transmitter; and a display apparatus that includes a plurality of diversity boards installed in a bezel of the display apparatus at predetermined intervals, and includes a power detector for each of the plurality of diversity boards so as to sense a signal of an NLOS condition or a maximum output signal from output powers when the received millimeter waves or terahertz waves are converted into a baseband signals, and to convert an output of a diversity board that obtains maximum output power into image data for displaying;

wherein the display apparatus comprises:

the plurality of diversity boards to receive millimeter waves or terahertz waves having different paths, to convert the received waves into a plurality of baseband signals, and to sense output powers of the plurality of baseband signal converters;

a controller to output a control signal for selecting a diversity board of a maximum output power from the output powers sensed by the plurality of diversity boards;

a selector to select the diversity board of the maximum output power among the plurality of diversity boards based on the control signal, and to connect the diversity board to an image converter; and the image converter to convert an output of the selector into image data for displaying.

* * * * *